J. Y. SCHELLY.
Spoke-Socket.
No. 26,447.
Patented Dec. 13, 1859.
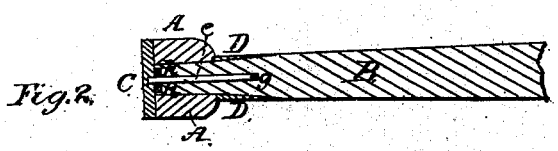
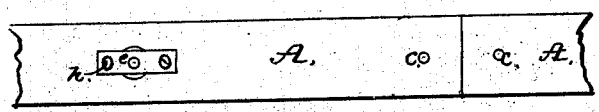
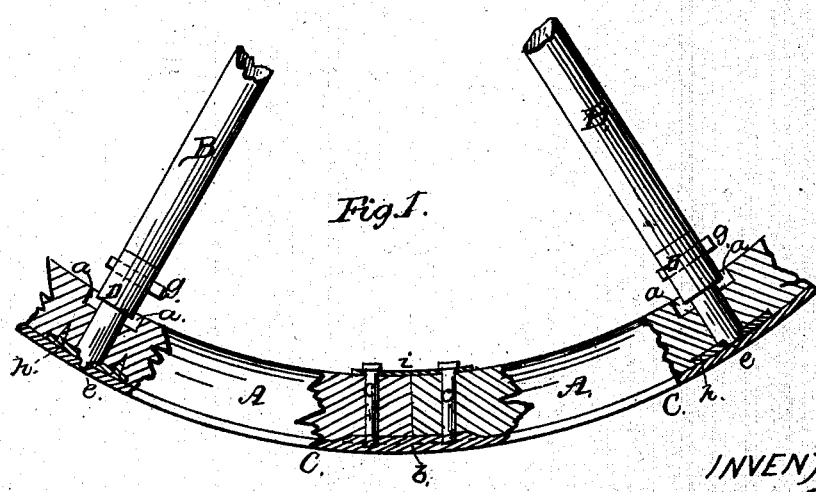
WITNESSES:
INVENTOR:
Jael Y. Schelly

UNITED STATES PATENT OFFICE.

JOEL Y. SCHELLY, OF HEREFORD, PENNSYLVANIA.

ATTACHING SPOKES OF CARRIAGE-WHEELS.

Specification of Letters Patent No. 26,447, dated December 13, 1859.

*To all whom it may concern:*

Be it known that I, JOEL Y. SCHELLY, of Hereford, in the county of Berks and State of Pennsylvania, have invented certain new and useful Improvements in Carriage-Wheels; and I do hereby declare that the following is a full, clear, and exact description thereof, reference being had to the accompanying drawings, forming a part of this specification, in which—

Figure 1 represents a portion of a wheel showing the manner of attaching the tie and spokes to the fellies. Fig. 2 is a cross section taken through the tire, felly and spoke. Fig. 3 is a view of a portion of two fellies with the tire removed.

Similar letters of reference indicate corresponding parts in the three figures.

The nature of my invention and improvements in carriage wheels consists, firstly, in connecting with or securing the spokes into the fellies in such a manner that they will be less liable to become loose, or break off in the fellies than by the present mode; secondly, in a novel manner of securing the tire upon the wheel so that it will be effectually prevented from slipping off, and so that the tire will not be impaired in strength by drilling holes through it for the admission of bolts as is at present resorted to; thirdly, in welding upon the inside of the tire plates of suitable thickness which overlap the joints of the fellies and which have female screw threads cut into them for receiving the ends of the bolts which secure the fellies and tire rigidly together at these points, thus adding greatly to the strength and durability of the wheel as hereinafter described.

To enable others skilled in the art to understand my invention I will proceed to describe its construction and operation.

A A represent the fellies of the wheel; B, the spokes, and C, the tire. The ends of the spokes which are to fit into mortises in the fellies are slightly tapered just behind the tennons so as to fit very tightly into malleable cast iron ferrules, D, which themselves have a tapering bore so as to be flush with the surface of the spokes. These ferrules have wings, *a a*, cast on either side and exactly opposite each other which are sunk or mortised into the fellies with the tenons of the spokes as represented by Figs. 1 and 2. These wings, *a a*, on the ferrules, greatly assist in giving strength and stiffness to those portions of the spokes which enter the fellies, especially if rivets are placed through the fellies on both sides of their tenon holes to keep them from splitting open, which should be done in all light vehicles intended for hard service. The ferrules, besides keeping the spokes rigidly in position serve also to prevent the decaying of the wood in a great measure and the loosening of the spokes from this cause.

The manner of securing the tire upon the wheel so as to effectually prevent its becoming loose in the wear and tear of the wheel so as to have a side play, as stated in the preamble, is accomplished by the following novel device. There are short grooves made into the inner face of the tire intermediate of its width—the tire and fellies being of exactly the same width, or should be—and in the direction of its circumference (or a groove might be milled into the tire its whole length) of a suitable width and depth. There are to be as many grooves made into the tire as there are to be spokes in the wheel; each groove or part of it to correspond with the hole or hollow bore made in the axis of the spokes, having the same width as the corresponding groove in the tire, as clearly shown by Figs. 1 and 2. This hole in the end of each spoke passes down to a lateral oblong perforation through the ferrule D, and receives a pin or bolt, *e*, the length of which is equal to that of the hole in the spoke, including the depth of the lateral hole above mentioned, with a notch in its end nearest the hub of the wheel, so that after the tire is on the wheel this bolt, *e*, (or bolts) will just reach down to the bottom of its grove in the tire; and in which position after having been forced or wedged down into it with a suitable tapering iron tool it is firmly kept in place by a wedged key bolt, *g*, with one of its edges so shaped as to fit into the notch in the bolt when it is driven through the lateral perforations in the spoke. After this key, *g*, has been inserted and the bolt, *e*, forced into its groove in the tire the ends of the key are filed off even with the ferrule, and so also with all the spokes in the wheel.

To securely prevent the bolts, *e*, from vibrating and working loose in the spoke iron plates, *h*, are let into the tire, face of the fellies and across the ends of the spoke tenons and secured in place by screws or nails which have perforations through them corresponding in diameter to the bolts, *e*, Through these plates the bolts pass before entering their grooves in the tire. These bolts, e, thus tightly and firmly fixed in each spoke and the grooves in the tire will completely prevent the latter and the fellies from slipping sidewise on each other as they are otherwise apt to do in consequence of the shrinking of the wood of the wheel.

The usual manner of securing the tire to the wheel is by drilling holes through the same at certain intervals apart and inserting bolts through the tire and fellies having heads to them which are countersunk in the tires and receive nuts on the inside of the fellies. This operation secures the tire to the fellies, and the joints of the fellies rigidly to the tire, but only for a short time for as the wheels are used and the tire wears thinner the heads of the bolts are worn off, the bolts become loosened and the tire itself is very much weakened by the holes in it for securing the bolts and the constant concussion upon the tire, particularly in paved streets, is very liable to crack or break it transversely at these points. These objections are obviated by my contrivance in a novel and efficient manner, and accomplished as follows: To keep the halves of the rim or fellies and the tire fastened together at their joints, screw plates, b, shown by Fig. 1 of the drawings, are welded on the inner face of the tire at said joints these plates may be three or four inches long and of the required breadth and thickness. The welded plates fit in corresponding cavities made in the face of the fellies, as shown by Fig. 3, of the drawings, over the joints. Into these plates are drilled and cut two screw holes sufficiently deep or quite through them. These holes in the plates, b, are at the proper points to correspond with holes made through the fellies in the usual manner for receiving the bolts, c, which have square heads. These bolts are accompanied with washers or washer plates, i, as is customary, the tire having of course been put upon the wheel in the usual way and with the requisite attention and care: by this device the last object is attained without there being holes made through the tire.

Having thus described my invention, what I claim as new, and desire to secure by Letters Patent, is:—

1. The ferrule, D, when furnished with wings, a a, and applied in the manner and for the purpose herein set forth.

2. The screw plates, b, welded upon the inside face of the tire, in the manner and for the purposes set forth.

3. I claim the combination of (with suitable slots made in the inside face of the tire) the bolt, e, key bolt, g, and plate, h, all arranged in the manner herein specified, for securing the tire rigidly in its place upon the wheel as stated.

JOEL Y. SCHELLY.

Witnesses:
   Jesse Hunsberger,
   Jessiah Jacob.